United States Patent
White (10) Patent No.: US 9,561,859 B2
(45) Date of Patent: Feb. 7, 2017

(54) LIFE VEST STOWAGE DEVICE

(75) Inventor: Noel Gregory White, West Sussex (GB)

(73) Assignee: SERVECORP LIMITED, West Sussex (GB)

(*) Notice: Subject to any disclaimer, the term of this patent is extended or adjusted under 35 U.S.C. 154(b) by 60 days.

(21) Appl. No.: 14/131,965

(22) PCT Filed: Jul. 10, 2012

(86) PCT No.: PCT/GB2012/051625
§ 371 (c)(1),
(2), (4) Date: Apr. 18, 2014

(87) PCT Pub. No.: WO2013/008006
PCT Pub. Date: Jan. 17, 2013

(65) Prior Publication Data
US 2015/0038030 A1 Feb. 5, 2015

(30) Foreign Application Priority Data
Jul. 13, 2011 (GB) .................................. 1112018.5

(51) Int. Cl.
*B65D 73/00* (2006.01)
*B64D 25/00* (2006.01)
(Continued)

(52) U.S. Cl.
CPC .............. *B64D 25/00* (2013.01); *B63C 9/11* (2013.01); *B63C 9/23* (2013.01); *B65D 5/0254* (2013.01); *B65D 27/22* (2013.01); *B65D 65/06* (2013.01)

(58) Field of Classification Search
CPC ......... B64D 25/00; B64D 25/18; B64D 25/16; B63C 9/11; B63C 9/23; B63C 9/22
See application file for complete search history.

(56) References Cited

U.S. PATENT DOCUMENTS 2,922,568 A 1/1960 Harker
4,560,356 A * 12/1985 Burr .................... B63C 9/08
222/5
(Continued)

FOREIGN PATENT DOCUMENTS

GB 589 074 A 6/1947
GB 749 819 A 5/1956
WO WO 03/024794 A1 3/2003

OTHER PUBLICATIONS

International Search Report prepared by the European Patent Office on Jan. 7, 2013, for International Application No. PCT/GB2012/051625.
(Continued)

*Primary Examiner* — Anthony Stashick
*Assistant Examiner* — James Way
(74) *Attorney, Agent, or Firm* — Sheridan Ross P.C.

(57) ABSTRACT

A life vest stowage device (1) comprises a receptacle (2) for stowing a life vest (3). The receptacle (2) has an opening (4) through which the life vest (3) is inserted into and removed from the receptacle (2). A closure is provided, by which the opening (4) can be opened and closed. The closure comprises a tongue (5) on a first side of the opening (4). The tongue (5) is arranged such that it can be folded across the opening (4) to obstruct the opening (4). On a second side of the opening (4), opposite to the first side of the opening (4), there is provided a pocket (6). The pocket (6) is arranged so that the tongue (5) can be inserted into the pocket (6) when the tongue is folded to obstruct the opening (4). With the tongue (5) folded to obstruct the opening (4) and inserted in the pocket (6), first and second strips (7, 16) of a second material are aligned with one another and can be squeezed together so that the closure is substantially flat. This ensures that the tongue (5) is secured in the pocket (6) by a hook and
(Continued)

loop fastener and allows a security seal (17) to be applied to the closure.

25 Claims, 13 Drawing Sheets (51) Int. Cl.
    *B63C 9/23*     (2006.01)
    *B63C 9/11*     (2006.01)
    *B65D 27/22*     (2006.01)
    *B65D 65/06*     (2006.01)
    *B65D 5/02*     (2006.01)

(56) References Cited

U.S. PATENT DOCUMENTS

| | | | | |
|---|---|---|---|---|
| 4,997,104 A * | 3/1991 | Pohl | ............... | B65D 33/1666 |
| | | | | 229/117.34 |
| 5,342,230 A * | 8/1994 | Louis | ............... | B63C 9/22 |
| | | | | 114/366 |
| 7,252,569 B2 * | 8/2007 | Everhart | ............... | B64D 11/06 |
| | | | | 206/769 |
| 2003/0215162 A1 * | 11/2003 | Switlik | ............... | B63C 9/23 |
| | | | | 383/59 |
| 2004/0066065 A1 * | 4/2004 | Forstner | ............... | B64D 11/06 |
| | | | | 297/188.08 |
| 2005/0062319 A1 * | 3/2005 | Hough | ............... | B63C 9/22 |
| | | | | 297/188.08 |
| 2008/0106127 A1 | 5/2008 | Hough | | |
| 2009/0242695 A1 * | 10/2009 | Lamoree | ............... | B64D 11/06 |
| | | | | 244/1 R |
| 2015/0034641 A1 * | 2/2015 | Aruga | ............... | B64D 11/0631 |
| | | | | 220/214 |

OTHER PUBLICATIONS

Written Opinion prepared by the European Patent Office on Jan. 7, 2013, for International Application No. PCT/GB2012/051625.
Search Report prepared by the United Kingdom Intellectual Property Office on Oct. 14, 2011, for Great Britain Application No. GB1112018.5.

* cited by examiner

LIFE VEST STOWAGE DEVICE

CROSS REFERENCE TO RELATED APPLICATIONS

This application is a national stage application under 35 U.S.C. 371 and claims the benefit of PCT Application No. PCT/GB2012/051625 having an international filing date of Jul. 10, 2012, which designated the United States, which PCT application claimed the benefit of Great Britain Application No. 1112018.5 filed Jul. 13, 2011, the disclosure of each of which are incorporated herein by reference.

FIELD OF THE DISCLOSURE

This disclosure relates to a life vest stowage device. It is particularly, but not exclusively, applicable to the stowage of life vests on commercial passenger aircraft.

BACKGROUND TO THE DISCLOSURE

Aviation regulations require commercial passenger aircraft to carry a life vest (or "life jacket") for each passenger. The life vest must be accessible to the passenger for use in the event of an emergency. In order to comply with these regulations, a life vest is usually stowed under each seat in a commercial passenger aircraft.

Life vest stowage devices are available for stowing life vests under aircraft seats. Regulations require that a passenger is able to remove a life vest from a life vest stowage device by application of a force of no greater than 6 N. They also require that the life vest should remain stowed in the life vest stowage device in the event of the aircraft suffering an impact of up to 16 G. Life vest stowage devices in current use therefore have closures that allow easy removal of a life vest whilst otherwise firmly retaining the life vest in the device.

Security requirements for life vest stowage devices are also becoming increasingly stringent. For example, all unsealed life vest stowage devices must have their life vests removed and be manually searched prior to an aircraft departing to enter or leave United States air space. A life vest is therefore typically secured in a life vest stowage device by a security seal. The security seal can be checked by airline ground crew to see whether or not it has been tampered with, thereby avoiding the need to search life vest stowage devices with intact security seals. With the life vest stowed and the security seal in place, it is important that access cannot be gained to the inside of the life vest stowage device, so that no foreign objects can be secreted inside the device in breach of aircraft security.

In view of the various aviation regulations and security requirements, increasingly complex closures and security seals have come into use. These closures and security seals can be time consuming to handle, leading to increased costs for airlines. There is therefore a need to provide simplified arrangements that require less time for airline ground crew to check and maintain whilst still being in conformity with the appropriate aviation regulations and security requirements.

SUMMARY OF THE DISCLOSURE

According to a first aspect of the disclosure, there is provided a life vest stowage device comprising:
a receptacle able to contain a life vest;
an opening in the receptacle through which the life vest is removable from the receptacle;
a tongue on a first side of the opening, which tongue is foldable between an unfolded configuration in which the opening is unobstructed and a folded configuration in which the tongue obstructs the opening;
a pocket on a second side of the opening, into which pocket the tongue is insertable in the folded configuration,
wherein, with the tongue in the folded configuration and inserted in the pocket, the first side of the opening, the second side of the opening, the tongue and the pocket are alignable so as to overlap one another and to be together substantially flat.

With the tongue in the folded configuration and inserted in the pocket, the tongue may be able to completely obstruct the opening.

The tongue may be foldable around an edge of the second side of the opening in the receptacle, which edge coincides with the perimeter of an opening in the pocket, through which opening the tongue is insertable in the pocket.

The life vest stowage device may further comprise a hook and loop fastener by which the tongue is releaseably securable in the pocket.

The life vest stowage device may further comprise a tab that, with the tongue in the folded configuration and inserted in the pocket, is extendable out of the pocket and cooperable with the tongue such that pulling the tab out of the pocket causes the tongue to be pulled out of the pocket and into the unfolded configuration.

With the tongue in the folded configuration and inserted in the pocket, the tab may be extendable out of the pocket from inside the receptacle between the tongue and the pocket.

In one example, the tab may extend from inside of the receptacle from a side wall of the receptacle, which side wall is on the second side of the opening. It may extend across the inside of the receptacle to the first side of the opening. It may also be slideably attached to the receptacle so as to be slideable relative to the receptacle in the direction it extends from inside the receptacle.

In another example, the tab is attached to the tongue.

The receptacle may comprise a first material and the pocket may comprise a sheet of a second material mounted on the second side of the opening in the receptacle.

The receptacle may comprise a/the first material and the opening in the receptacle is reinforced with a sheet of a/the second material mounted on the first side of the opening in the receptacle.

The sheet(s) of the first material may be mounted on the outside of the receptacle.

The second material may be stiffer than the first material.

The second material may be a polycarbonate film.

According to a second aspect of the disclosure, there is provided a life vest stowage device as described above and a life vest stowed inside the receptacle.

According to a third aspect of the disclosure, there is provided a life vest stowage device as described above and a security seal comprising an adhesive label mountable, with the tongue in the folded configuration and inserted in the pocket, in a position in which it extends from the outside of the pocket to the outside of the first side of the opening.

The security seal may have a hole through which the tab is extendable when the security seal is mounted in position.

The security seal may be perforated along a line that is alignable with a/the opening of the pocket when the security seal is mounted in position.

Preferred embodiments will now be described, by way of example only, with reference to the accompanying drawings.

DETAILED DESCRIPTION OF PREFERRED EMBODIMENTS

Referring to FIGS. 1 to 7, a life vest stowage device 1 according to a first preferred embodiment comprises a receptacle 2 for stowing a life vest 3. The life vest stowage device 1 is suitable for use on a commercial passenger aircraft. As such, it is arranged to be securable under an aircraft seat. Straps or other mountings (not shown) are provided on the life vest stowage device 1 for this purpose, but are omitted from the accompanying drawings for clarity.

Figure 1:
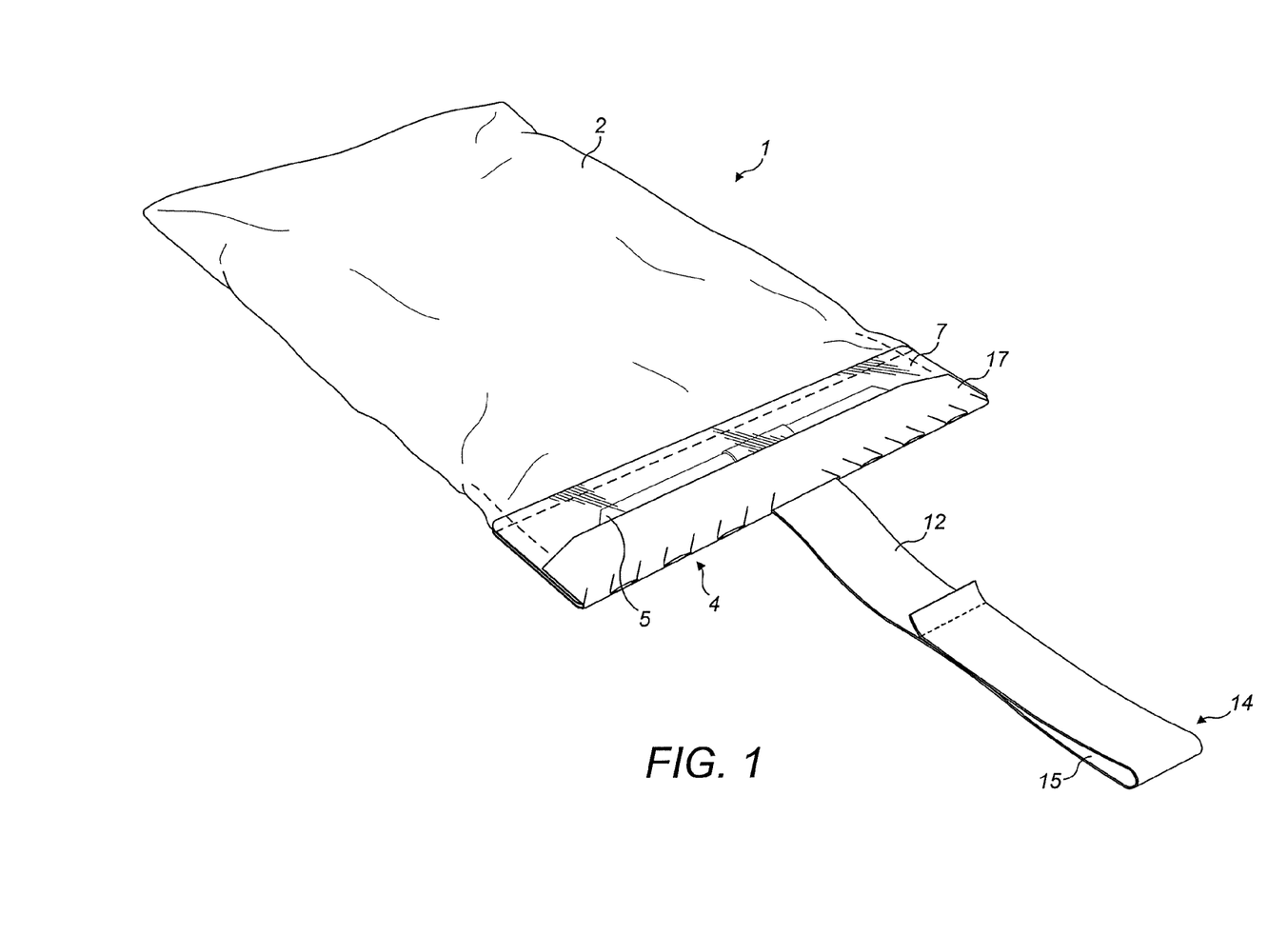
FIG. 1 is a perspective view of a life vest stowage device according to a first preferred embodiment.
Figure 2:
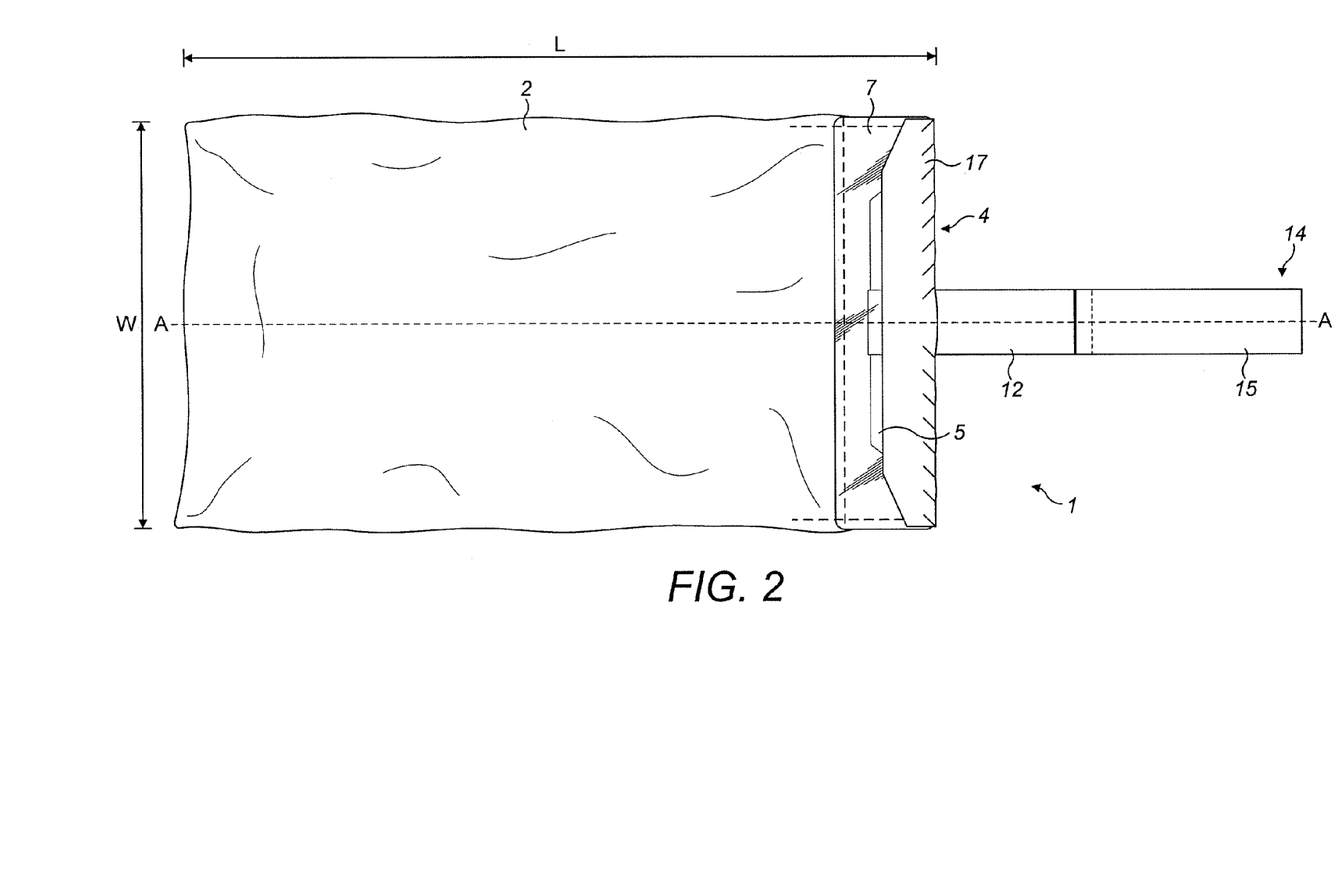
FIG. 2 is a top view of the life vest stowage device according to the first preferred embodiment.

The receptacle 2 has an opening 4 through which the life vest 3 is inserted into and removed from the receptacle 2. For the purposes of this description, the opening 4 can be considered to be a path along which the life vest 3 can be inserted into and removed from the receptacle 2 and, more specifically, the part of that path at which the life vest 3 passes between inside and outside of the receptacle 2.

Conventionally, three different sizes of life vests 3 are specified for use on commercial passenger aircraft. When folded for stowing, a small life vest 3 is approximately 24 cm long, 13 cm and 6 cm deep; a medium life vest 3 is approximately 22 cm long, 16 cm wide and 6 cm deep and a large life vest 3 is approximately 22 cm long, 20 cm wide and 7 cm deep. Typically, the receptacle 2 of the life vest stowage device 1 is large enough to be able to contain a large life vest 3 snugly.

In this embodiment, the receptacle 2 is a bag. The bag is a single piece of a first material folded over itself and joined along its edges, except at one end where the opening 4 is provided in the receptacle 2. In this embodiment, the first material is a cloth and the edges are joined by stitching. The cloth is typically fire resistant, and in this embodiment is a polyamide substrate with polyurethane coating and a fluorocarbon finish. In other embodiments, other types of cloth are used and the edges can be joined by glue or heat treatment. In order to accommodate a large life vest 3 snugly, the bag has a length L of approximately 29 cm, including a closure described below, and a width W of approximately 24 cm. The bag is flat when empty, and accommodates the life vest 3 by deforming to a required height, in a direction normal to the plane defined by its length L and width W. In other embodiments, the bag is of a different construction or has different dimensions. It is also possible for the receptacle 2 to be a container that is substantially non-deformable instead of a bag.

The opening 4 extends across the entire width of the receptacle 2. A closure is provided, by which the opening 4 can be opened and closed. The closure comprises a tongue 5 on a first side of the opening 4. In this embodiment, the tongue 5 is a part of the first material of the bag that extends from the opening 4. In other embodiments, for example where the receptacle 2 is a non-deformable container, the tongue 5 is a separate piece of material.

The tongue 5 is arranged such that it can be folded across the opening 4 to obstruct the opening 4. The tongue 5 can be arranged to obstruct the opening 4 just partially. However, in this embodiment, the tongue 5 is arranged to be able to obstruct the opening 5 completely. In order to achieve this, the tongue 5 extends across the entire width of the receptacle 2, like the opening 4. The complete obstruction of the opening 4 has the advantage of allowing the tongue 5 to help prevent access to the inside of the receptacle 2 when it has been folded to obstruct the opening 4.

On a second side of the opening 4, opposite to the first side of the opening 4, there is provided a pocket 6. The pocket 6 is arranged so that the tongue 5 can be inserted into the pocket 6 when the tongue is folded to obstruct the opening 4. That is, the pocket 6 has internal dimensions similar to the external dimensions of the tongue 5, and the tongue 5 is foldable into the pocket 6.

In this embodiment, the pocket 6 comprises a first strip 7 of a second material fixed to the outside of the receptacle 2. The first strip 7 extends across the whole width of the receptacle 2. The periphery of the first strip 7 is fixed to the receptacle 2, except at one side of the first strip 7. The unfixed side provides an opening 8 in the pocket 6, between the first strip 7 and the receptacle 2. The opening 8 in the pocket 6 is adjacent the opening 4 in the receptacle 2. More specifically, the perimeter of the opening 4 in the receptacle 2 and the perimeter of the opening 8 in the pocket 4 coincide at an edge 9 of the receptacle 2 on the second side of the opening 4 in the receptacle 2. The tongue 5 can be folded around this edge 9 to obstruct the opening 4 in the receptacle 2 and to be inserted in the pocket 6. In this embodiment, the unfixed side of the periphery of the first strip 7 and the edge 9 of the receptacle 2 around which the tongue can be folded are in line with one another. This means that it is easy for a user to manipulate the tongue 5 into the opening 8 in the pocket 5. However, this feature is not essential and, in other embodiments, the unfixed side of the periphery of the first strip 7 can extend further than the edge 9 of the receptacle 2 in a direction outward from the inside of the receptacle 2. This can allow the tongue 5 to be recessed under the first strip 7 when it is folded and inserted into the pocket 4.

A hook and loop fastener is provided between the tongue 5 and the pocket 6. In this embodiment, the hook and loop fastener is Velcro®. A first part 10 of the hook and loop fastener is fixed to the inside of the pocket 6. In this embodiment, the first part 10 of the hook and loop fastener is fixed to the outside of the receptacle 2, under the location where the first strip 7 is fixed to the receptacle 2 to provide the pocket 6. A second part 11 of the hook and loop fastener is fixed to the tongue 5 so as to overlap the first part 10 of the hook and loop fastener when the tongue 5 is inserted in the pocket 6.

A tab 12 is provided to facilitate pulling the tongue 5 out of the pocket 6 and unfolding the tongue 5 so that the opening 4 in the receptacle 2 is unobstructed by the tongue 5. In this embodiment, the tab 12 is fixed to the tongue 5. More specifically, a first end 13 of the tab 12 is fixed to the tongue 5 intermediate the width of the receptacle 2. In this embodiment, the first end 13 of the tab 12 is fixed to the tongue 5 in the middle of the width of the receptacle 2, which is also the middle of the length of the tongue 5 in a direction across the first side of the opening 2 in the receptacle 4. The first end 13 of the tab 12 is fixed to a first surface of the tongue 5 that faces the inside of the receptacle 2. This means that, with the tongue 5 folded to obstruct the opening 4 in the receptacle 2 and inserted in the pocket 5, the tab 12 extends around an edge of the tongue 5 to a second surface of the tongue 5, opposite to the first surface. From the second surface, the tab 12 extends out of the pocket 5. At a second end 14 of the tab 12, opposite to the first end 13, the tab 12 is folded over and fixed to itself to provide a loop 15. This loop 15 can be pulled by a user.

On the first side of the opening 4 in the receptacle 2, a second strip 16 of the second material is provided on the outside of the receptacle 2. However, it is not essential that the material of the first and second strips 7, 16 is the same, and in other embodiments that the second strip 16 may be of the third material. The second (and third) material is stiffer than the first material of the bag. In this embodiment, the second material is a polycarbonate film, such as Lexan®. An edge of the second strip 16 of the second material is aligned with an edge of the first strip 7 of the second material at the unfixed side of that strip 7, and the first and second strips 7, 16 of the second material overlap one another. Indeed, in this embodiment, the first and the second strips 7, 16 of the second material have identical dimensions and are arranged exactly on top of one another on the first and second sides of the opening 4 in the receptacle 2.

A security seal 17 is provided for affixing to the outside of the closure. The security seal 17 has dimensions similar to the first and second strips 7, 16 of the second material. In particular the security seal 17 has a length L' that is approximately equal to the width of the opening 4 in the receptacle 2.

Figure 7:
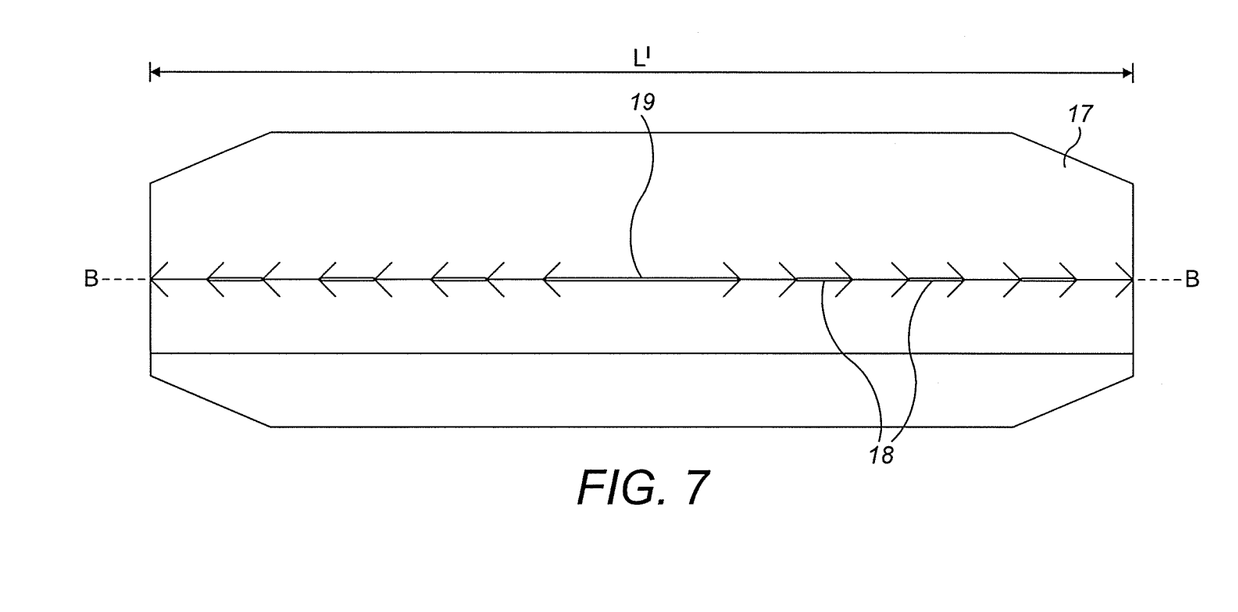
FIG. 7 is a top view a security seal for the life vest stowage device.
Figure 8:
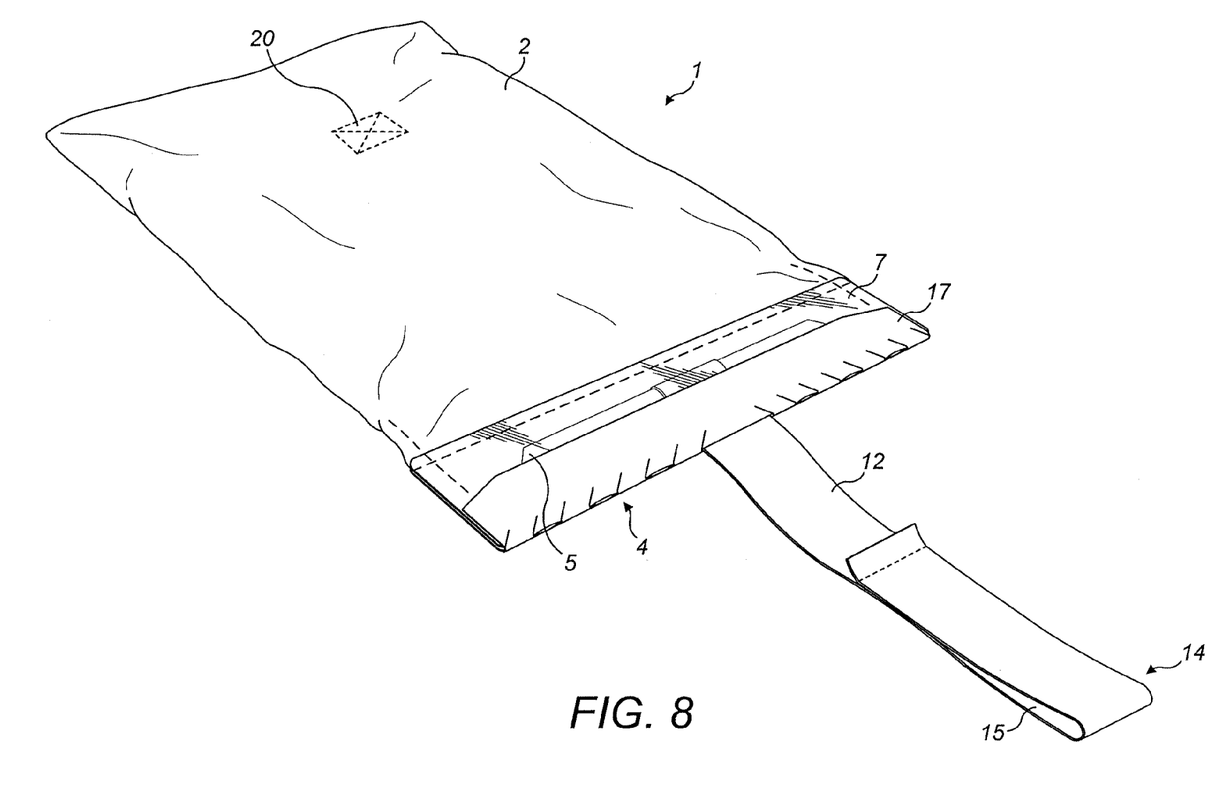
FIG. 8 is a perspective view of a life vest stowage device according to a second preferred embodiment.
Figure 9:
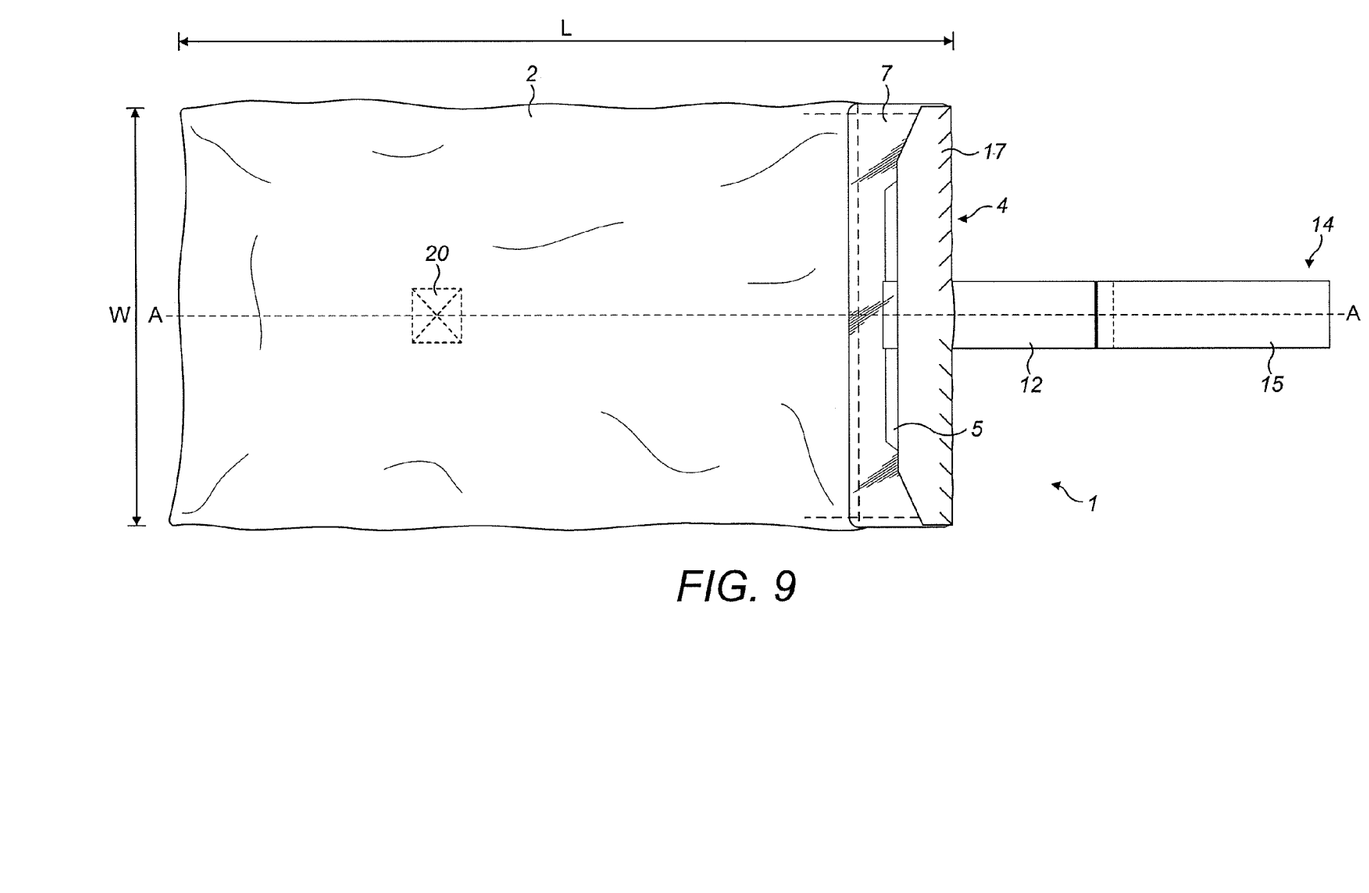
FIG. 9 is a top view of the life vest stowage device according to the second preferred embodiment.
Figure 10:
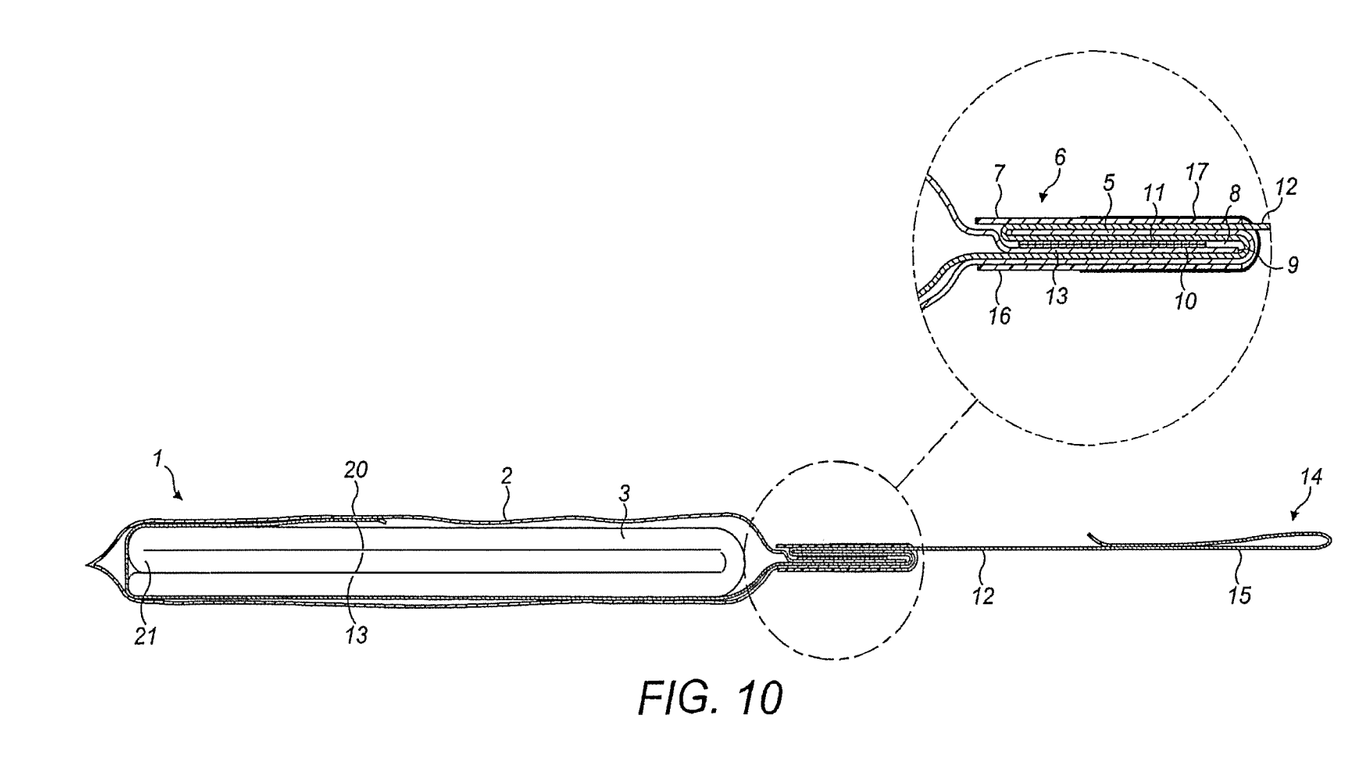
FIG. 10 is a sectional view of the life vest stowage device according to the second preferred embodiment, with the life vest stowed in the device, wherein the section is along the line A-A in FIG. 9 and wherein the Figure includes a magnified view of a closure of the device.
Figure 11:
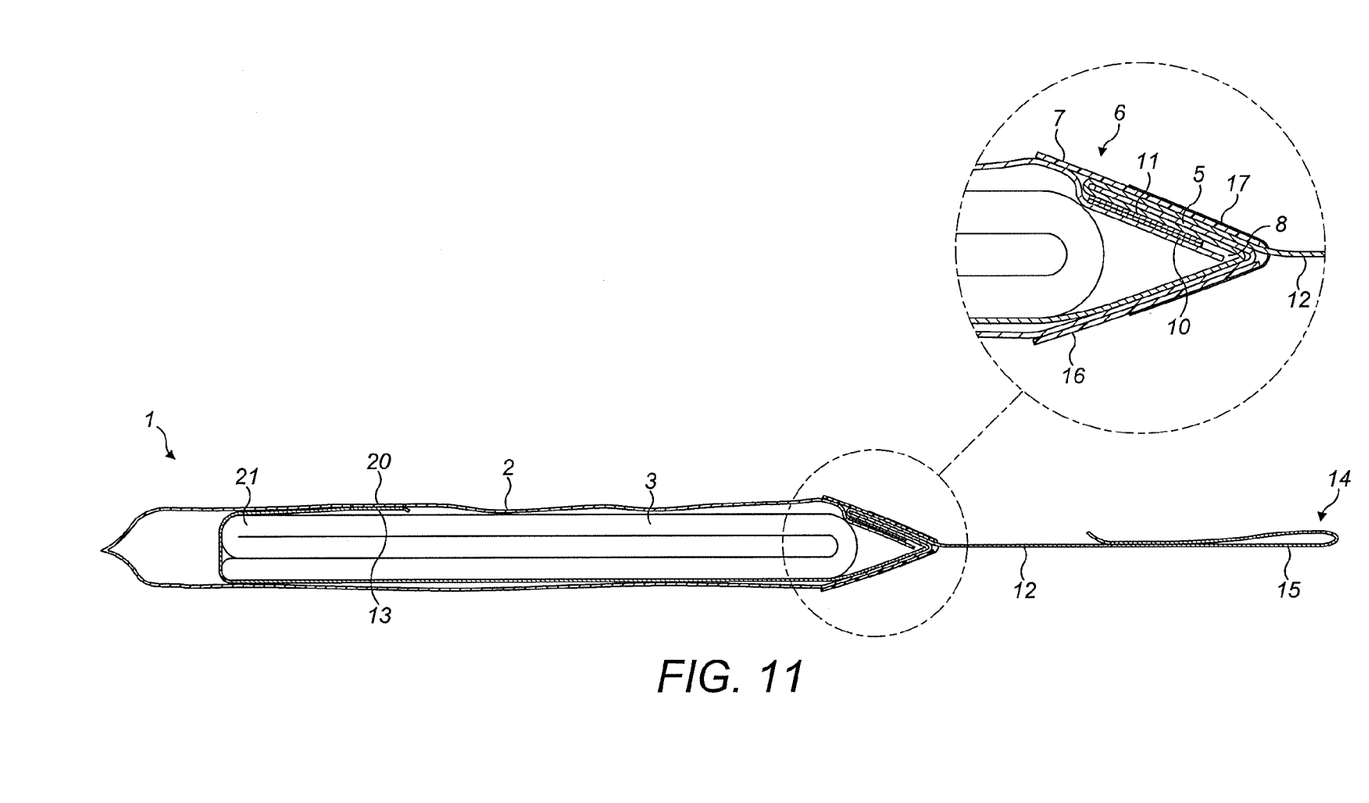
FIG. 11 is a sectional view of the life vest stowage device according to the second preferred embodiment, with the life vest stowed in the device and dislodged through use, wherein the section is along the line A-A in FIG. 9 and wherein the Figure includes a magnified view of the closure.
Figure 12:
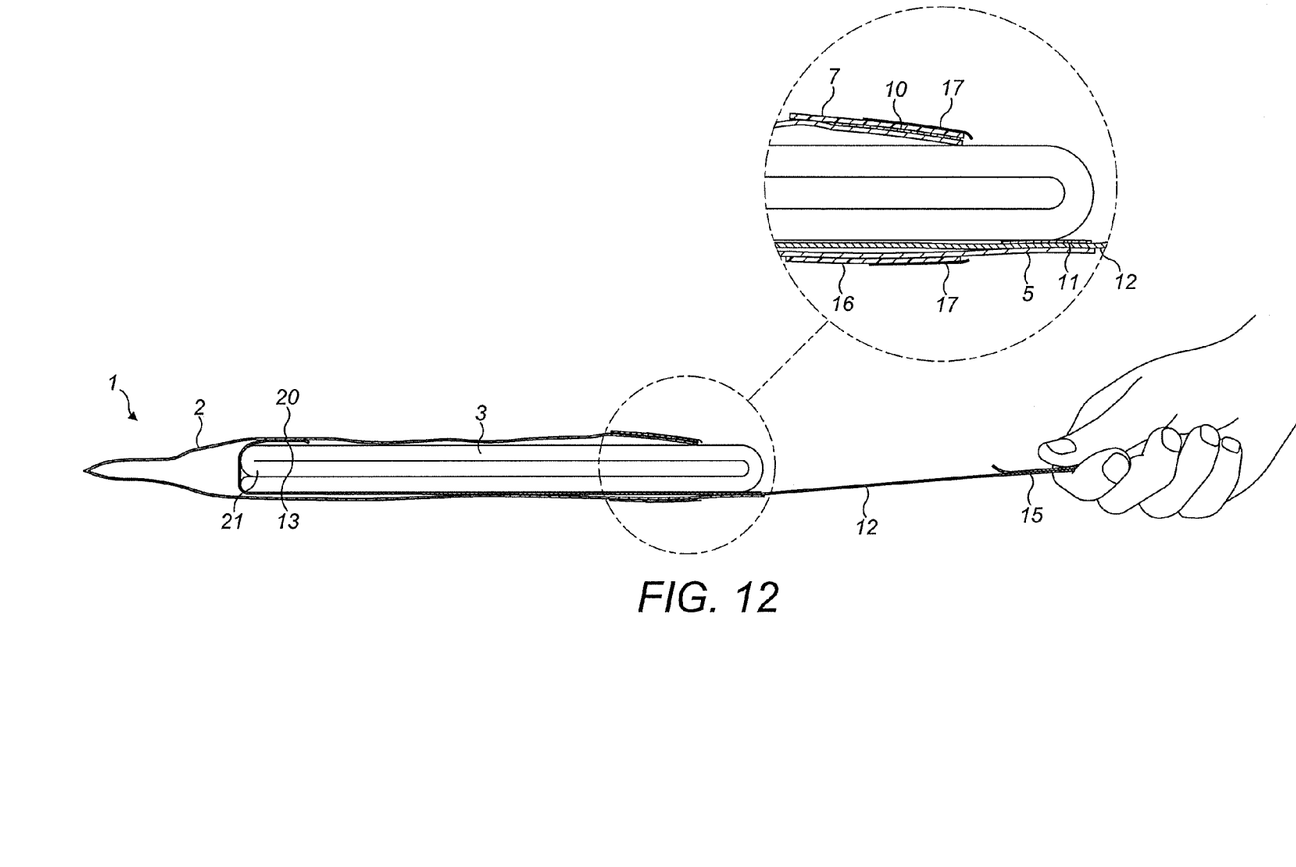
FIG. 12 is a sectional view of the life vest stowage device according to the second preferred embodiment, with the closure having been opened, with the life vest partially removed from the device, wherein the section is along the line A-A in FIG. 9 and wherein the Figure includes a magnified view of the closure.
Figure 13:
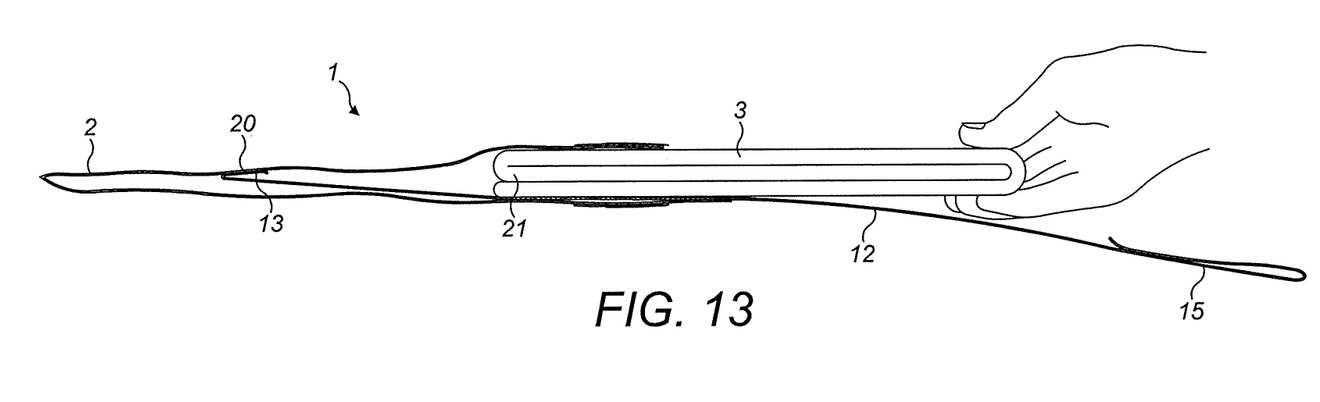
FIG. 13 is a sectional view of the life vest stowage device according to the second preferred embodiment, with the life vest removed further from the device and wherein the section is along the line A-A in FIG. 9.

Referring in particular to FIG. 7, the security seal 17 has a line of weakness along line B-B in the drawing. In this embodiment, the line of weakness is a line of perforations 18 in the security seal 17. In other embodiments, the line of weakness is a fold or thinner part of the security seal 17.

The security seal 17 has a hole 19 through which the tab 12 can pass. In this embodiment, the hole 19 is at the middle of the line of weakness. Moreover, the line of weakness bisects the security seal 17, such that the hole 19 is at the centre of the security seal 17.

One surface of the security seal 17 is covered with glue (not shown). The glue is usually covered by a protective cover (not shown), which is removable to expose the glue when it is desired to affix the security seal 17 to the receptable 2. The security seal 17 is provided with a membrane (not shown) that disintegrates to reveal a visual indicator of the security seal 17 being removed from the receptacle 2 after it has been affixed to it. Such membranes are known in the field of the disclosure.

In use, the life vest 3 is inserted into the receptacle 2 through the opening 4 in the receptacle 2. With the life vest 3 inside the receptacle 2, the tongue 5 is folded across the opening 4 in the receptacle 2 to obstruct the opening 2. More specifically, the tongue 5 is folded around the edge 9 of the receptacle 2 on the second side of the opening 2 and inserted into the pocket 6. As the tongue 5 is inserted into the pocket 6, the two parts 10, 11 of the hook and loop fastener come into contact with one another and secure the tongue inside the pocket 6. The tab 12 folds around the tongue 5 and extends out of the receptacle 2. More specifically, the tongue 5 extends from the first surface of the tongue 5, to the second surface of the tongue 5 and out of the pocket 6.

Figure 3:
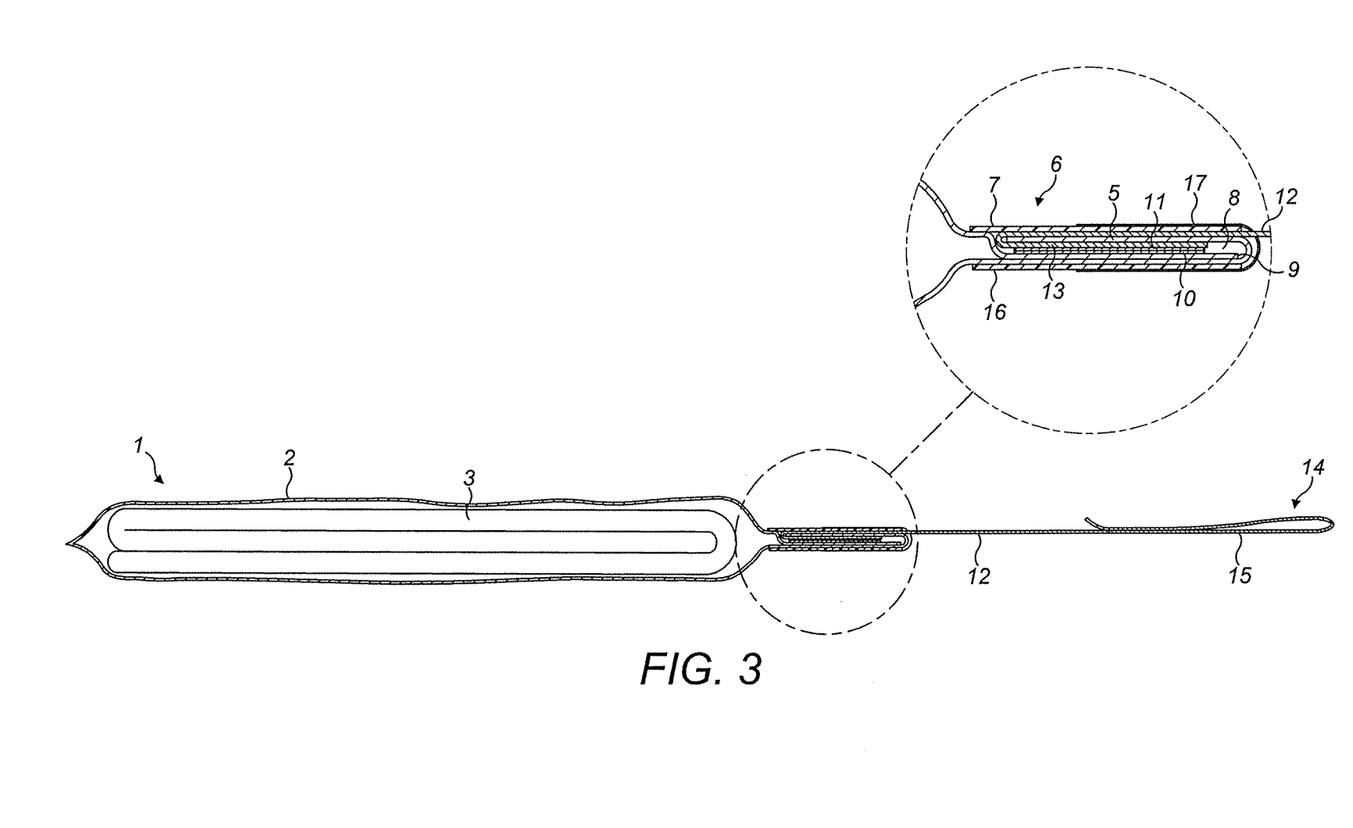
FIG. 3 is a sectional view of the life vest stowage device according to the first preferred embodiment, with the life vest stowed in the device, wherein the section is along the line A-A in FIG. 2 and wherein the Figure includes a magnified view of a closure of the device.

With the tongue 5 folded to obstruct the opening 4 in the receptacle 2 and inserted in the pocket 6, the first and second strips 7, 16 of the second material on each side of the opening 4 in the receptacle 2 are aligned with one another. Moreover, the first and second strips 7, 16 of the second material can be squeezed together so that the closure of the life vest stowage device 1 is substantially flat, as shown in FIG. 3. This ensures that the tongue 5 is well secured in the pocket 6 by the hook and loop fastener. Also, the security seal 17 can easily be applied to the closure by first sliding tab 12 through the hole 19 in the security seal 17 until the security seal 17 abuts the receptacle 2, secondly affixing a first portion of the security seal on one side of the line of weakness to one of the first and second strips 7, 16 of the second material, and thirdly affixing a second portion of the security seal 17 on the other side of the line of weakness to the other of the first and second strips 7, 16 of the second material. As the closure is substantially flat, affixing the security seal 17 firmly to the first and second strips 7, 16 of the second material is easy and reliable.

Figure 4:
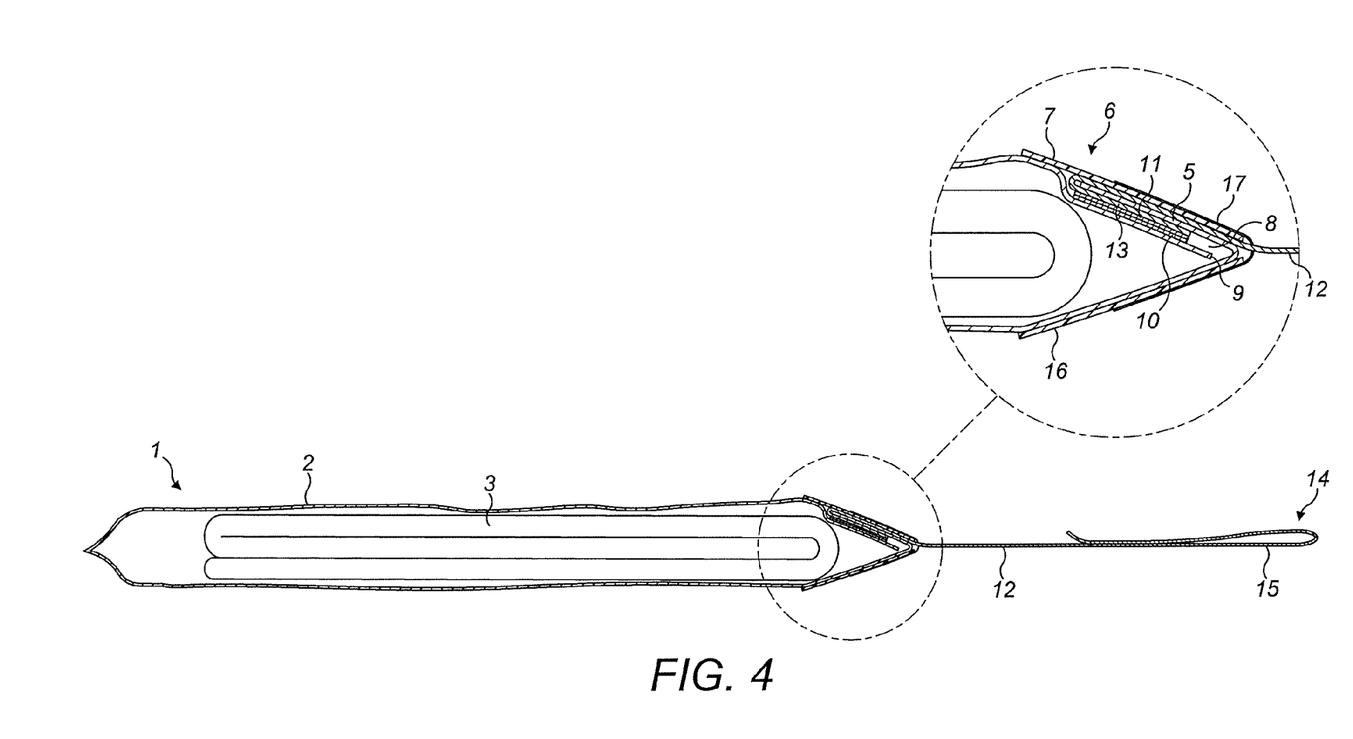
FIG. 4 is a sectional view of the life vest stowage device according to the first preferred embodiment, with the life vest stowed in the device and dislodged through use, wherein the section is along the line A-A in FIG. 2 and wherein the Figure includes a magnified view of the closure.

The life vest stowage device 1 can then be positioned appropriately under an aircraft seat. In the event of the life vest 3 becoming dislodged within the receptacle 2, for example if the aircraft suffers an impact, the life vest 3 is held within the receptacle 2 by the closure. More specifically, the life vest 3 will have a tendency to press against the first and second sides of the opening 2 in the receptacle 4 from within the receptacle 2, as shown in FIG. 4. This has the effect of gently urging the tongue 5 to move out of the pocket 6. However, this force is easily overcome by the hook and loop fastener. Moreover, the life vest 3 presses against the second side of the opening 4 in the receptacle 2, this presses the first and second parts 10, 11 of the hook and loop fastener together, thereby increasingly securing the tongue 5 in the pocket 6. In this way, the life vest stowage device 1 can easily meet the requirement of airline regulations that the life vest 3 should remain within the life vest stowage device 1 in the event of the aircraft suffering an impact of up to 16G.

Figure 5:
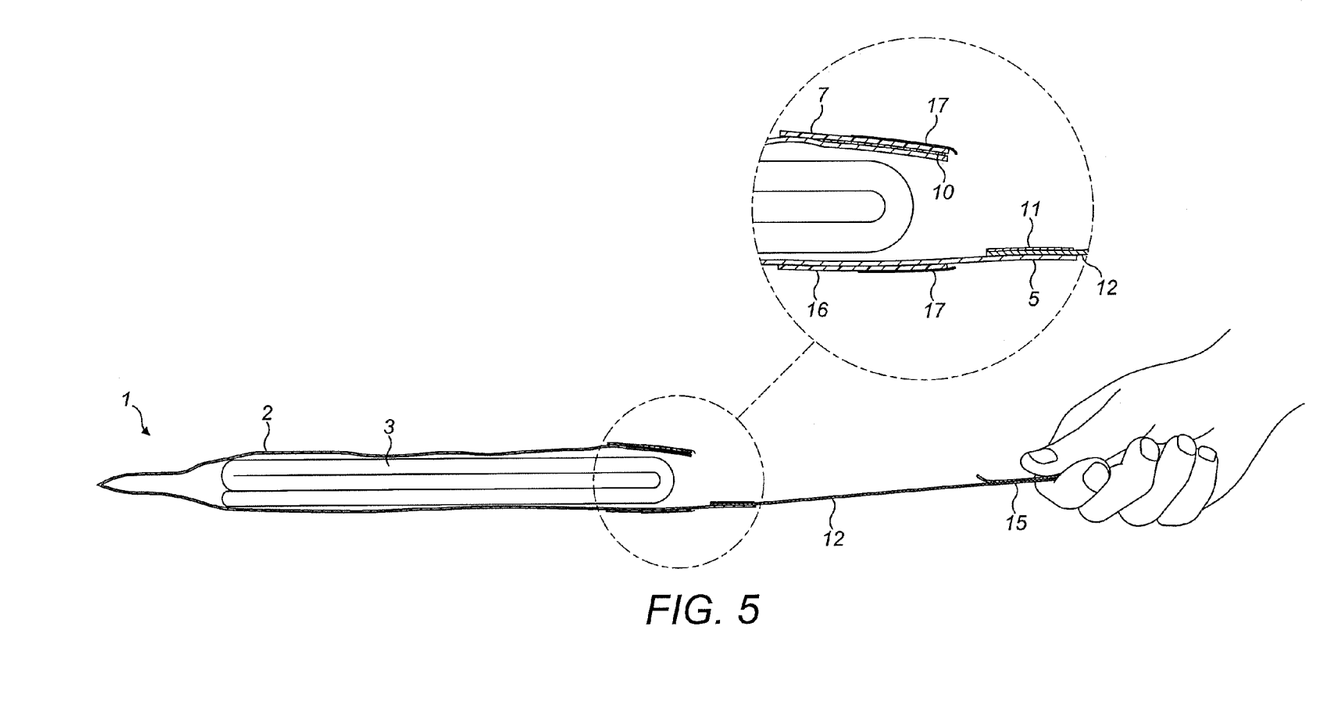
FIG. 5 is a sectional view of the life vest stowage device according to the first preferred embodiment, with the closure having been opened, wherein the section is along the line A-A in FIG. 2 and wherein the Figure includes a magnified view of the closure.
Figure 6:
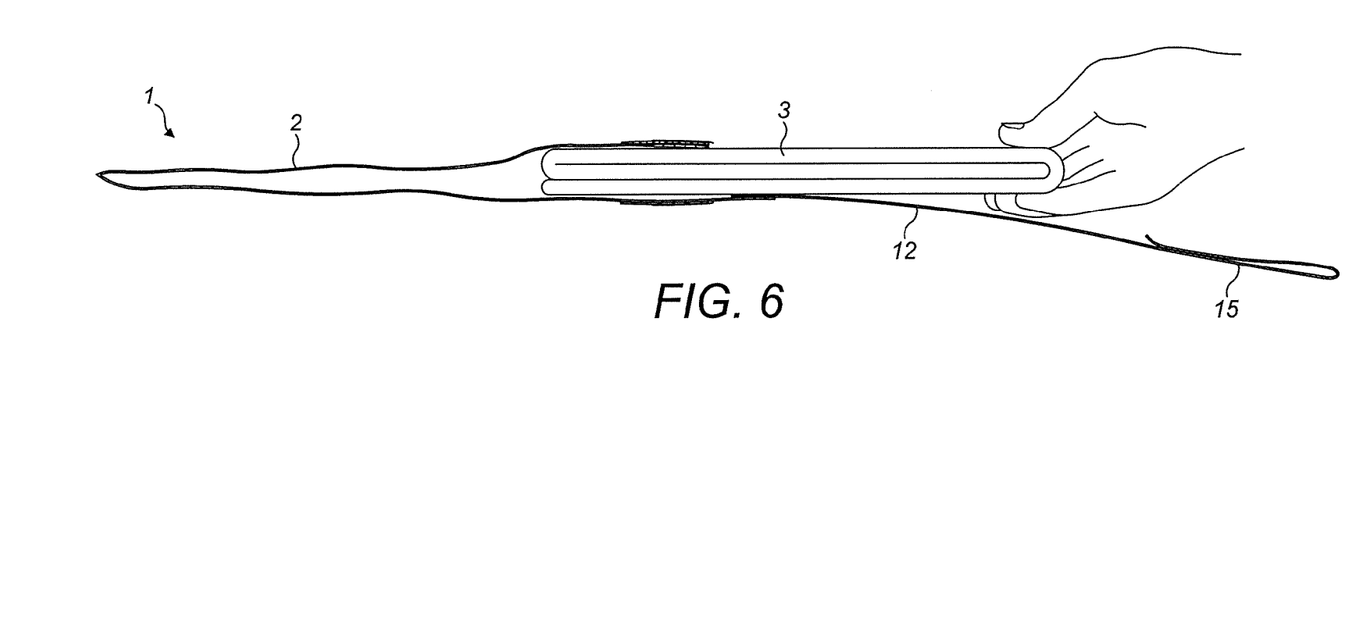
FIG. 6 is a sectional view of the life vest stowage device according to the first preferred embodiment, with the life vest partially removed from the device and wherein the section is along the line A-A in FIG. 2.

Should a passenger need to retrieve the life vest 3 from the life vest stowage device 1, the passenger pulls the tab 12 away from the receptacle 2. This urges the tongue 5 out of the pocket 6 and unfolds the tongue 5 to leave the opening 4 in the receptacle 2 unobstructed, as shown in FIG. 5. The passenger can then reach into the receptacle 2 through the opening 4 and pull the life vest 3 out of the life vest stowage device 1, as shown in FIG. 6. As the tab 12 is attached to the tongue 5, and in particular because the tab 12 extends around an edge of the tongue 5 deepest in the pocket 6, pulling the tab 12 imparts a force on the tongue 5 that urges the first and second parts 10, 11 of the hook and loop fastener apart. This means that the passenger can pull the tongue 5 out of the pocket 6 with a force below the 6 N required by airline regulations.

Referring to FIGS. 8 to 13, a life vest stowage device 1 according to a second preferred embodiment is similar to the life vest stowage device 1 according to the first preferred embodiment and the same reference numerals are used in the drawings for similar components. However, the tab 12 of the life vest stowage device 1 of the second preferred embodiment is extendable from inside the receptacle 2 from an attachment point 20 on a side wall of the receptacle 2 on the same side of the receptacle 2 as the second side of the opening 4 in the receptacle 2. The first end 13 of the tab 12 is fixed to the receptacle at the attachment point 20.

From the attachment point 20, the tab 12 extends to the tongue 5. However, in the position at which the tab 12 is fixed to the tongue 5 in the first embodiment, the tab 12 is slidably attached to the tongue 5 so as to be slideable relative to the tongue 2 in the direction that the tab 12 extends from inside the receptacle 2. More specifically, the tab 12 passes between the tongue 5 and the second part 11 of the hook and loop fastener, and the second part 11 of the hook and loop fastener is fixed to the tongue 5 so as to provide a guide (not shown) for the tab 12. It is the guide slideably attaches the tab 12 to the tongue 5. It will be appreciated that, in order to extend from the attachment point 20 out through the opening 4 in the receptacle, the tab 12 is longer in the second embodiment than in the first embodiment.

In use, when the life vest 3 is inserted into the receptacle 2, it meets the tab 12 where it extends from the attachment point 20 across the receptacle 2 to the tongue 5. Pushing the life vest 3 into the receptacle urges the tab 12 further into the receptacle 2, with the tab extending around an end 21 of the life vest 3 deepest within the receptacle 2. Later, when the passenger pulls the tab 12, once the tongue 5 has been removed from the pocket 6 and the tongue 5 is unfolded such that the opening 4 in the receptacle 2 is unobstructed, further pulling of the tab 12 urges the life vest 3 out of the receptacle 2. This has the advantage of making it easier for the passenger to retrieve the life vest 3 from within the life vest stowage device 1.

It is not essential that the tab 12 is slideably attached to tongue 5. This feature may be omitted altogether, with it being down to the user to position the tab 12 appropriately when inserting the life vest 3 in the receptacle 2. In another embodiment, the tab 12 is slideably attached to the receptacle 2 on an inside surface of the receptacle 2 on the first side of the opening 4, elsewhere than to the tongue 5.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements, the term "a" or "an" does not exclude a plurality, a single feature may fulfill the functions of several features recited in the claims and reference signs in the claims shall not be construed as limiting the scope of the claims. It should also be noted that the Figures are not necessarily to scale; emphasis instead generally being placed upon illustrating the principles of the present disclosure.

The invention claimed is:

1. A life vest stowage device comprising:
   a receptacle able to contain a life vest;
   an opening in the receptacle through which the life vest is removable from the receptacle;
   a tongue on a first side of the opening, which tongue is foldable between an unfolded configuration in which the opening is unobstructed and a folded configuration in which the tongue obstructs the opening;
   a pocket on a second side of the opening, wherein the pocket comprises a first strip, wherein the periphery of the first strip is fixed to the receptacle, except at one side of the first strip, and into which pocket the tongue is insertable in the folded configuration via the one side of the first strip;
   wherein, with the tongue in the folded configuration and inserted in the pocket, the first side of the opening, the second side of the opening, the tongue and the pocket are alignable so as to overlap one another and to be together substantially flat; and comprising a tab that, with the tongue in the folded configuration and inserted in the pocket, is extendable out of the pocket and cooperable with the tongue such that pulling the tab out of the pocket causes the tongue to be pulled out of the pocket and into the unfolded configuration.

2. The life vest stowage device of claim 1, wherein, with the tongue in the folded configuration and inserted in the pocket, the tongue is able to completely obstruct the opening.

3. The life vest stowage device of claim 1, wherein the tongue is foldable around an edge of the second side of the opening in the receptacle, which edge coincides with the perimeter of an opening in the pocket, through which opening the tongue is insertable in the pocket.

4. The life vest stowage device of claim 1, comprising a hook and loop fastener by which the tongue is releaseably securable in the pocket.

5. The life vest stowage device of claim 1, wherein, with the tongue in the folded configuration and inserted in the pocket, the tab is extendable out of the pocket from inside the receptacle between the tongue and the pocket.

6. The life vest stowage device of claim 1, wherein the tab extends from inside of the receptacle from a side wall of the receptacle, which side wall is on the second side of the opening.

7. The life vest stowage device of claim 6, wherein the tab extends across the inside of the receptacle to the first side of the opening.

8. The life vest stowage device of claim 5, wherein the tab is slideably attached to the receptacle so as to be slideable relative to the receptacle in the direction it extends from inside the receptacle.

9. The life vest stowage device of claim 1, wherein the tab is attached to the tongue.

10. The life vest stowage device of claim 1, wherein the receptacle comprises a first material and the pocket comprises a sheet of a second material mounted on the second side of the opening in the receptacle.

11. The life vest stowage device of claim 1, wherein the receptacle comprises a first material and the opening in the receptacle is reinforced with a sheet of a second material mounted on the first side of the opening in the receptacle.

12. The life vest stowage device of claim 10, wherein the sheet of the second material is mounted on the outside of the receptacle.

13. The life vest stowage device of claim 10, wherein the second material is stiffer than the first material.

14. The life vest stowage device of claim 10, wherein the second material is a polycarbonate film.

15. A life vest stowage device of claim 1 and a life vest stowed inside the receptacle.

16. A life vest stowage device of claim 1 and a security seal comprising an adhesive label mountable, with the tongue in the folded configuration and inserted in the pocket, in a position in which it extends from the outside of the pocket to the outside of the first side of the opening.

17. The life vest stowage device of claim 16, wherein the security seal has a hole through which the tab is extendable when the security seal is mounted in position.

18. The life vest stowage device of claim 16, wherein the security seal is perforated along a line that is alignable with an opening of the pocket when the security seal is mounted in position.

19. The life vest stowage device of claim 10, wherein the receptacle is reinforced with a sheet of the second material mounted on the first side of the opening in the receptacle.

20. The life vest stowage device of claim 11, wherein the sheet of the second material is mounted on the outside of the receptacle.

21. The life vest stowage device of claim 11, wherein the second material is stiffer than the first material.

22. The life vest stowage device of claim 11, wherein the second material is a polycarbonate film.

23. The life vest stowage device of claim 19, wherein the sheets of the second material are mounted on the outside of the receptacle.

24. The life vest stowage device of claim 19, wherein the second material is stiffer than the first material.

25. The life vest stowage device of claim 19, wherein the second material is a polycarbonate film.

* * * * *